United States Patent
Johnson et al.

(10) Patent No.: US 10,894,997 B2
(45) Date of Patent: Jan. 19, 2021

(54) LITHIUM RECOVERY FROM PHOSPHATE MINERALS

(71) Applicant: LI-Technology Pty Ltd., Belmont (AU)

(72) Inventors: Gary Donald Johnson, Belmont (AU); Mark Daniel Urbani, Wattle Grove (AU); Nicholas John Vines, High Wycombe (AU)

(73) Assignee: LI-Technology Pty Ltd., Belmont (AU)

( * ) Notice: Subject to any disclaimer, the term of this patent is extended or adjusted under 35 U.S.C. 154(b) by 254 days.

(21) Appl. No.: 15/999,094

(22) PCT Filed: Feb. 17, 2017

(86) PCT No.: PCT/AU2017/050142
§ 371 (c)(1),
(2) Date: Aug. 17, 2018

(87) PCT Pub. No.: WO2017/139852
PCT Pub. Date: Aug. 24, 2017

(65) Prior Publication Data
US 2019/0185963 A1    Jun. 20, 2019

(30) Foreign Application Priority Data
Feb. 18, 2016   (AU) .................... 2016900582

(51) Int. Cl.
*C22B 26/12*   (2006.01)
*C22B 3/08*    (2006.01)
(Continued)

(52) U.S. Cl.
CPC ............ *C22B 26/12* (2013.01); *C22B 1/00* (2013.01); *C22B 3/08* (2013.01); *C22B 3/44* (2013.01); *Y02P 10/20* (2015.11)

(58) Field of Classification Search
CPC .. C22B 26/12; C22B 1/00; C22B 3/08; C22B 3/44; Y02P 10/234
See application file for complete search history.

(56) References Cited

U.S. PATENT DOCUMENTS 1,591,196 A      7/1926  Weidmann
2,024,026 A  *  12/1935  Coleman ................. C22B 26/12
                                                              423/179.5
(Continued)

FOREIGN PATENT DOCUMENTS

CN      102285673 A     12/2011
GB         424757 A      2/1935
WO    WO-2015/058287 A1  4/2015

OTHER PUBLICATIONS

Mbaya et al. ("Atmospheric pressure leaching application for the recovery of copper and nickel from low-grade sources." The Southern African Institute of Mining and Metallurgy Base Metals Conference. 2013.) (Year: 2013).*

(Continued)

*Primary Examiner* — Anthony J Zimmer
*Assistant Examiner* — Ricardo D Morales
(74) *Attorney, Agent, or Firm* — Harness, Dickey & Pierce, P.L.C.

(57) ABSTRACT

A process for the recovery of lithium from minerals rich in lithium and phosphate, the process comprising passing an ore containing one or more minerals rich in lithium and phosphate to an acid leach step thereby producing a pregnant leach solution, subjecting the pregnant leach solution to a series of process steps by which one or more impurity elements are removed, and recovering lithium as a lithium containing salt product, wherein the series of process steps by which one or more impurity elements are removed includes a low pH impurity removal step conducted at an (Continued)

elevated temperature for the precipitation of one or more impurities.

20 Claims, 2 Drawing Sheets

(51) Int. Cl.
*C22B 3/44* (2006.01)
*C22B 1/00* (2006.01)

(56) References Cited

U.S. PATENT DOCUMENTS

| 2,040,573 | A | 5/1936 | Siegens et al. | |
|---|---|---|---|---|
| 8,431,005 | B1* | 4/2013 | Zbranek | C01D 5/00 |
| | | | | 205/482 |
| 2016/0265085 | A1* | 9/2016 | Bourassa | C25B 1/14 |

OTHER PUBLICATIONS

International Search Report for PCT/AU2017/050142, ISA/AU, Woden Act, dated Mar. 27, 2017.
Written Opinion of the ISA for PCT/AU2017/050142, ISA/AU, Woden Act, dated Mar. 27, 2017.
Kalenowski and Runke, *Recovery of lithium from spodumene-amblygonife mixtures*, Bureau of Mines, US Department of the Interior, Report of Investigations 4863; 1952.
Extended European Search Report for related European Application 17752577.1 dated Jul. 25, 2019.

* cited by examiner

LITHIUM RECOVERY FROM PHOSPHATE MINERALS

CROSS-REFERENCE TO RELATED APPLICATIONS

This application is a 371 U.S. National Stage of International Application No. PCT/AU2017/050142, filed Feb. 17, 2017, which claims the benefit of Australian Patent Application No. 2016900582, filed Feb. 18, 2016. The disclosures of the above applications are incorporated herein by reference.

FIELD OF THE INVENTION

The present invention relates to a process for the recovery of lithium from phosphate rich minerals. More particularly, the process of the present invention is intended to allow for the recovery of lithium from minerals such as amblygonite and montebrasite.

The process of the present invention consists of a novel and improved combination of operating steps, one or more of which may have been used previously, in other combinations and for other purposes, in mineral processing and hydrometallurgical processes.

BACKGROUND ART

The major sources of commercially mined $Li_2CO_3$ have historically come from brine solution and spodumene containing ores. To date, there has been no commercial production of $Li_2CO_3$ from amblygonite rich ores or concentrates. Amblygonite is present in many pegmatite deposits, and co-exists with spodumene in some pegmatites. The presence of amblygonite is problematic for refineries that produce $Li_2CO_3$ from spodumene concentrate. As such, the lithium content of amblygonite holds no value and is rejected at the spodumene concentrator.

There have been several efforts to recover lithium from amblygonite in the laboratory. Importantly, none of these prior art efforts have involved direct leaching in acidic media of the mineral.

In 1935 Coleman and Jaffa obtained U.S. Pat. No. 2,024,026 for a process to recover lithium from amblygonite, which involved a two stage leaching process. The ore is initially leached in hot sodium hydroxide solution for several hours to produce a slurry containing dissolved aluminium phosphate and an insoluble lithium rich residue. The residue is further treated with phosphoric acid or sodium di-hydrogen phosphate solution to remove the remaining phosphate, then leached with sulfuric acid to dissolve lithium. The process operating costs appear high due to the requirement for sodium hydroxide solution, and the alkaline leach liquor requires further processing to produce a stable waste stream.

Siegens and Roder obtained U.S. Pat. No. 2,040,573 in 1936 for a process to extract lithium from amblygonite ore. This process involved pre-heating the ore with sulfuric acid at temperatures between 100-200° C., followed by roasting at temperatures up to 850° C. Water leaching the calcine effectively extracts 95% lithium from the ore into a solution as lithium sulfate. This process relies on low energy costs to be commercially viable, due to the requirement for heating and roasting.

Kalenowski and Runke also describe a high temperature roasting process to extract lithium from amblygonite, see *Recovery of lithium from spodumene-amblygonite mixtures*, Bureau of Mines, U.S. Department of the Interior, Report of Investigations 4863; 1952. Amblygonite concentrate was mixed with gypsum and lime (at a 2:1 mass ratio) and roasted at 950° C. for up to 2 hours. The resulting calcine was water leached at 20% solids, which resulted in a lithium extraction of 97.3% from the concentrate. This process also requires low energy costs to be commercially viable.

The separation of lithium from phosphate has been considered problematic by those working in this field. In part this is due to both lithium phosphate and lithium carbonate being insoluble at high pH (>7). Therefore the conditions of the low pH precipitation stage are critical in separating lithium from phosphate and minimising the lithium losses as precipitation of lithium phosphate.

The recovery process of the present invention has as one object thereof to substantially overcome the problems associated with the prior art or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia or any other country or region as at the priority date of the application.

It is to be understood that use of the term 'minerals rich in lithium and phosphate' or similar includes minerals that contain phosphorous and lithium in their chemical structure, such as is exemplified by amblygonite and montebrasite. This term is not intended to include, and is not to be understood to include, ores or concentrates of non-lithium phosphate containing mineral, such as apatite $Ca_5(PO_4)_3$ (OH), in combination with a non-phosphate lithium containing mineral such as lepidolite.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a process for the recovery of lithium from minerals rich in lithium and phosphate, the process comprising passing an ore containing one or more minerals rich in lithium and phosphate to an acid leach step thereby producing a pregnant leach solution, subjecting the pregnant leach solution to a series of process steps by which one or more impurity elements are removed, and recovering lithium as a lithium containing salt product, wherein the series of process steps by which one or more impurity elements are removed includes a low pH impurity removal step conducted at an elevated temperature for the precipitation of one or more impurities.

Preferably, the elevated temperature of the low pH impurity removal step is greater than about 90° C.

Preferably, a base is added to the low pH impurity removal step. The base is preferably one or more of limestone, lime or monovalent carbonate or hydroxide salts. The precipitated impurities preferably include sulfuric acid, sodium, aluminium, phosphate and/or fluoride.

Still preferably, the conditions of the low pH impurity removal step are such that minimal lithium is co-precipitated. In one form, substantially no lithium is co-precipitated in the low pH impurity removal step.

Preferably, the lithium containing salt product contains $Li_2CO_3$ and/or $LiOH \cdot H_2O$.

Preferably, the lithium and phosphate rich minerals include amblygonite and/or montebrasite.

Preferably, a pre-treatment step is provided prior to the acid leach step. The pre-treatment step may comprise one or both of a concentration step and a milling step. The milling step may preferably be a fine milling step. The concentration step may be a flotation step.

Still preferably, the milling step produces a product having a particle size of $<P_{80}$ 150 micron.

Still further preferably, the milling step (ii) produces a product having a particle size of $<P_{80}$ 75 micron.

Preferably, concentrated sulfuric acid is added during the leach step.

Still preferably, the acid leach step results in at least a proportion of any contained lithium, sodium, phosphate, aluminium and fluoride being extracted into solution, thereby forming the pregnant leach solution ("PLS").

Preferably, the leaching step is conducted under atmospheric pressure conditions.

The leaching step is preferably conducted at a temperature close to boiling, for example at or about 90 to 120° C.

The leaching step is preferably carried out with an excess of $H_2SO_4$ providing a free acid concentration of greater than about 50 g/L $H_2SO_4$.

Still preferably, the total sulfate concentration is close to the saturation limit of the solution at the leaching temperature. For example, this may be 6.0 M S at >90° C.

Still further preferably, in the leach step greater than about 90% metal extraction is achieved with a retention time of about 12 hours.

Preferably, solids from the low pH impurity removal step are washed with water to recover entrained lithium.

From the low pH impurity removal step filtrate is passed to a high pH impurity removal step, in which impurity base metals are precipitated through the addition of a base. The base is preferably lime and/or a monovalent hydroxide salt. The impurity base metals may preferably include iron, manganese and/or magnesium.

Preferably, calcium is precipitated from the filtered product of the high pH impurity removal step by the addition of a monovalent carbonate salt. The carbonate salt is preferably one of $Li_2CO_3$ or $Na_2CO_3$.

Still preferably, lithium carbonate is precipitated by the addition of a monovalent carbonate salt to the filtered product of calcium precipitation. The carbonate salt is preferably $Na_2CO_3$. Separation of the lithium carbonate is preferably effected by filtration or decantation.

In one form of the present invention the process for the recovery of lithium from lithium and phosphate rich minerals comprises the method steps of:

(i) Separation of the mineral rich in lithium and phosphate from gangue minerals by a first pre-treatment step being froth flotation to produce a concentrate;

(ii) Fine milling the concentrate of step (i) in a second pre-treatment step;

(iii) Leaching the milled concentrate of step (ii) in sulfuric acid solution under atmospheric pressure conditions to convert the lithium, sodium, and aluminium to soluble sulfates and to extract any fluoride and phosphate present;

(vi) Impurities present in the pregnant leach liquor, including $H_2SO_4$, sodium, aluminium, phosphate and fluoride are removed by precipitation using a suitable base, including limestone, lime, or monovalent carbonate or hydroxide salts in a low pH impurity removal step;

(vii) Separation of the impurity metals and sulfate from the liquor by filtration or decantation whereby the resulting filtrate contains more than 90% of the lithium contained in the PLS, and washing the solids with water to recover entrained lithium;

(viii) Precipitation of impurity base metals, including iron, manganese and/or magnesium, using a base, which may be lime or a monovalent hydroxide salt, in a high pH impurity removal step;

(ix) Separation of the impurity metals and sulfate from the liquor by filtration or decantation whereby the resulting filtrate contains more than 90% of the lithium contained in the PLS, and washing the solids with water to recover entrained lithium;

(x) Precipitation of calcium ions by the addition of a monovalent carbonate salt;

(xi) Separation of the precipitated calcium salt from the liquor by filtration or decantation whereby the resulting filtrate contains more than 90% of the lithium contained in the PLS;

(xii) Precipitation of lithium carbonate by the addition of a monovalent carbonate salt and separation of the lithium salt from the liquor by filtration or decantation; and (xiii) Crystallisation of monovalent sulfate salts from filtrate by salting out and/or evaporation.

Preferably, the lithium and phosphate rich minerals include amblygonite and/or montebrasite.

The milling step (ii) preferably produces ore or concentrate at a particle size of $<P_{80}$ 150 micron.

Still preferably, the milling step (ii) produces the ore or concentrate at a particle size of $<P_{80}$ 75 micron.

Preferably, the leaching step (iii) is conducted under atmospheric conditions at a temperature close to boiling, for example between about 90 to 120° C. Still preferably, the leaching step (iii) is carried out with an excess of $H_2SO_4$ allowing for a free acid concentration of >50 g/L $H_2SO_4$.

Still preferably, the total sulfate concentration should be such that it is close to the saturation limit of the solution at the leaching temperature. For example, this could be 6.0 M S at >90° C. Under these conditions >90% metal extraction is achieved within 12 hours.

Preferably, the impurity removal stage (vi) should be operated at a pH of <7, for example between 2 to 3. Preferably, limestone is utilised in impurity removal stage (vi). Limestone is a cheap base and removes sulfate as gypsum and as well as phosphate as calcium phosphate.

Preferably, the base metal removal stage (viii) should be operated at a pH of >9. Preferably, lime is utilised in the base metal removal stage (viii) as it is a cheap base and removes sulfate as gypsum.

Preferably, the calcium precipitation step (x) is conducted by the addition of $Na_2CO_3$ and or $Li_2CO_3$ product and the precipitated $CaCO_3$ is recycled to stage (vi). Washing the precipitate is not required.

Preferably, the $Li_2CO_3$ precipitation stage (xii) is operated at elevated temperature and the liquor volume is reduced by evaporation. This will result in a higher lithium recovery. For example, this may be >90° C.

BRIEF DESCRIPTION OF THE DRAWINGS

The process of the present invention will now be described, by way of example only, with reference to one embodiment thereof and the accompanying drawings, in which.

BEST MODE(S) FOR CARRYING OUT THE INVENTION

Figure 1:
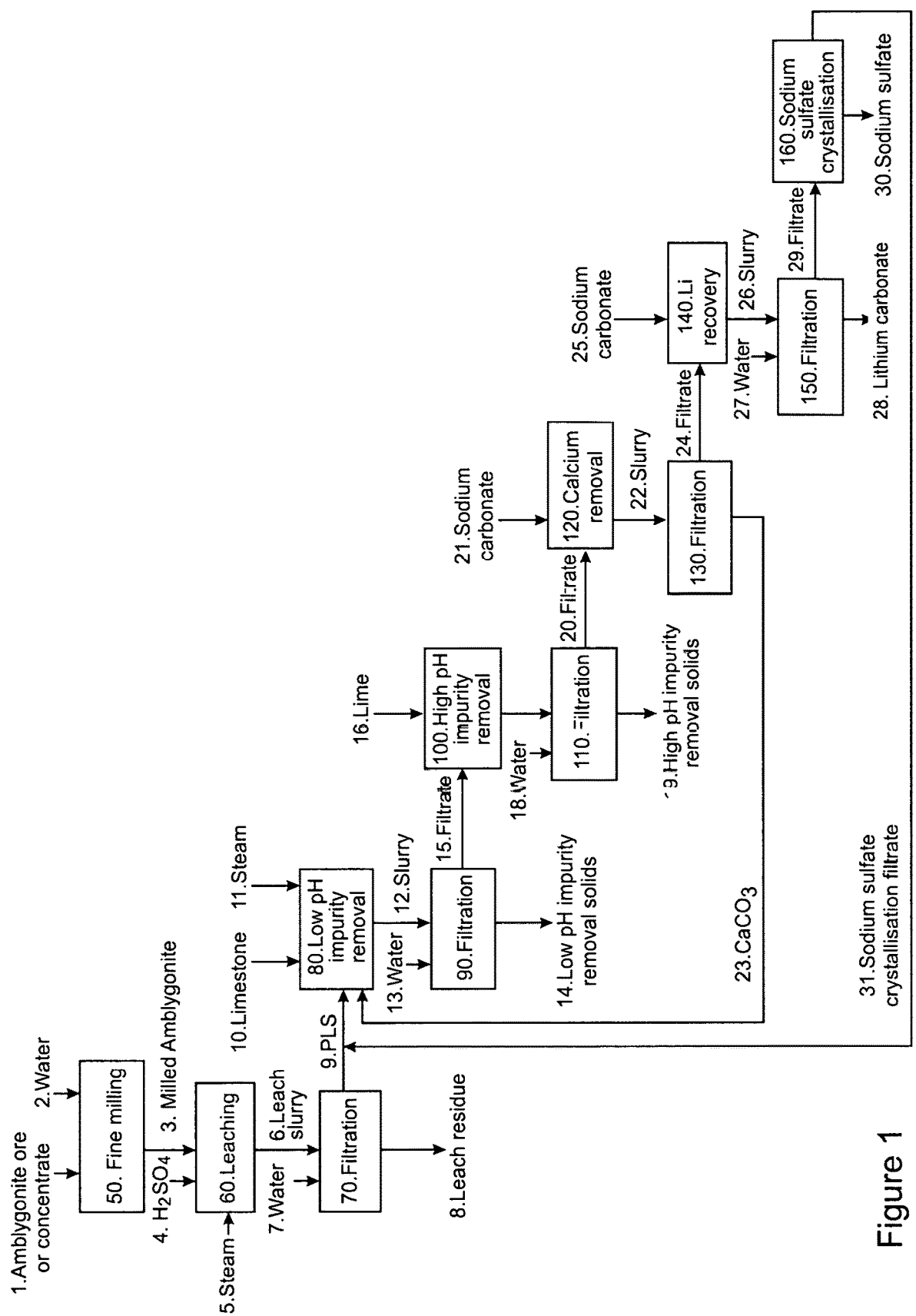
FIG. 1 is a flow sheet depicting a process for the recovery of lithium from lithium and phosphate rich minerals in accordance with the present invention, showing as one embodiment in particular a process for recovery of lithium from amblygonite ore or concentrate by acid leach, impurity removal, and $Li_2CO_3$ recovery.

The process of the present invention comprises a novel and improved combination of operating steps, one or more of which may have been used previously, in other combinations and for other purposes, in mineral processing and hydrometallurgical processes.

In very general terms, in one embodiment of the present invention, a lithium and phosphate containing mineral, for example amblygonite, is pre-concentrated, if required, by a mineral separation process, for example flotation. The amblygonite ore or concentrate is then subject to a pre-treatment step comprising, for example, fine milling. The lithium, sodium, phosphate, aluminium and fluoride present in amblygonite are extracted by strong sulfuric acid leaching, producing a leach liquor or pregnant leach solution containing lithium, sodium, phosphate, aluminium and fluoride. Lithium is separated from residual impurities, including, but not limited to, sulfuric acid, phosphate, aluminium, iron, manganese, calcium, sodium and fluoride by hydrometallurgical techniques, such as selective precipitation and crystallisation, to produce saleable $Li_2CO_3$.

Amblygonite is a fluoro-phosphate mineral composed of lithium, sodium, aluminium, phosphate, fluoride and hydroxide. The mineral occurs in pegmatite deposits. The standard chemical formula for amblygonite is, but is not limited to, $(Li,Na)AlPO_4(F,OH)$. Associated minerals include quartz, feldspar, spodumene, lepidolite, tourmaline, columbite, cassiterite, topaz and beryl. Amblygonite can contain up to 10.3% $Li_2O$ and is considered, for the purposes of this document, to be both lithium and phosphate "rich". Other minerals with similar levels of lithium and phosphate content should be considered as similarly lithium and phosphate rich. In terms of simply lithium content, a content of greater than about 6 to 8% lithia may be considered lithium rich.

The amblygonite in pegmatite bodies can be separated from the gangue minerals by flotation, or classification.

It is envisaged that the processes of the present invention are applicable to montebrasite, which is similar to amblygonite, but with a lower fluoride content and richer in hydroxide. References hereinafter to amblygonite are, unless clearly otherwise from the context, to be considered to include reference to montebrasite.

In one form of the present invention the process comprises the method steps of:

(i) Separation of the lithium and phosphate containing mineral, amblygonite, from gangue minerals, such as quartz and feldspar, by froth flotation, if required, to produce an amblygonite concentrate;

(ii) Fine milling the amblygonite concentrate;

(iii) Leaching amblygonite in sufficient sulfuric acid solution under atmospheric conditions to enable the lithium, sodium and aluminium to be converted to soluble sulfates and to also extract any fluoride and phosphate present;

(iv) Impurities present in the lithium containing filtrate, such as $H_2SO_4$, sodium, aluminium, phosphate and fluoride are removed by precipitation using a suitable base, such as limestone, lime or monovalent carbonate or hydroxide salts, but preferably limestone. The pH of the solution is increased by the addition of the base to allow for the neutralisation and precipitation of the impurities;

(vii) Separation of the impurity metals and sulfate from the liquor by filtration or decantation in which the resulting filtrate contains the large majority of the lithium contained from the initial amblygonite ore or concentrate. The solids are washed with water to recover entrained lithium;

(viii) Precipitation of impurity base metals, such as, but not limited to, manganese and magnesium, using a suitable base, such as lime or monovalent hydroxide salts, but preferably lime;

(ix) Separation of the impurity metals and sulfate from the liquor by filtration or decantation in which the resulting filtrate contains the large majority of the lithium contained from the initial amblygonite ore or concentrate. The solids are washed with water to recover entrained lithium;

(x) Precipitation of calcium ions by the addition of a monovalent carbonate salt, such as $Li_2CO_3$ or $Na_2CO_3$;

(xi) Separation of the precipitated calcium salt from the liquor by filtration or decantation in which the resulting filtrate contains the large majority of the lithium contained from the initial amblygonite ore or concentrate;

(xii) Precipitation of $Li_2CO_3$ by the addition of a monovalent carbonate salt, such as $Na_2CO_3$. Separation of the lithium salt from the liquor by filtration or decantation; and (xiii) Crystallisation of monovalent sulfate salts from the filtrate by salting out and/or evaporation.

Amblygonite ore or concentrate is treated in accordance with the present invention as shown in FIG. 1. The relative grades of the metals in amblygonite are described only by way of example, and the process of the present invention is expected to be able to treat any amblygonite bearing material, not dependent on grade.

In FIG. 1 there is shown a flow sheet in accordance with the present invention and in which the embodiment depicted is particularly intended for the processing of amblygonite containing ore or concentrate 1 to recover lithium as $Li_2CO_3$ 28.

The amblygonite containing ore or concentrate 1 is passed to a pre-treatment step, for example a milling step 50, with water 2, in which the ore or concentrate is milled to reduce the particle size, for example to $<P_{80}$ 150 micron and preferably to $<P_{80}$ 75 micron, which enables rapid dissolution of the contained amblygonite. The milled amblygonite 3 is directed to a leach step 60 in which at least a proportion of the contained lithium, sodium, phosphate, aluminium and fluoride are extracted into solution forming a pregnant leach solution ("PLS"). Concentrated $H_2SO_4$ 4 is added to the leach stage. The leach reactors employed in the leach step 60 are heated using steam 5 to allow for high metal extractions and relatively short retention time.

The leach step is conducted, for example, in a single stage at between 95 to 105° C., at atmospheric pressure, and in the presence of sufficient acid to convert the cations to sulfates.

The leach slurry 6 is passed from the leach step 60 to a solid liquid separation step, for example a belt filter 70, which enables the leach slurry to be filtered at or near the leaching temperature. The filtration stage produces a PLS 9 containing the bulk of the extracted lithium, sodium, phosphate, aluminium and fluoride and a leach residue 8, which is washed with water 7. The wash filtrate can be combined with the PLS 9 and the leach residue 8 is discarded.

The total sulfate concentration in the leach step 60 is such that it is close to the saturation limit of the solution, being 80 to 90%, at the leaching temperature. For example, this is 6.0 M S at >90° C. Under these conditions the Applicants have noted >90% metal extraction is achieved within 12 hours.

The PLS 9, exiting the filtration stage 70, contains more than 90% of the lithium in the contained ore or concentrate. $H_2SO_4$ is neutralised and impurity elements, such as sodium, aluminium, phosphate and fluoride, are precipitated from the PLS 9 by the addition of lime or limestone 10, and steam 11, in a low pH impurity removal stage 80, at a pH of between 2 to 3. A slurry 12 from stage 80 is passed to a solid liquid separation stage 90 to separate the liquor and solids. The solids are washed with water 13, and the impurity solids 14 are then discarded.

The low pH impurity removal stage 80 operates at a temperature of >90° C. and under the following conditions. The precipitation of alunite analogues ($NaAl_3(XO_4)_2(Y)_6$) is targeted, whereby X is $SO_4$ and/or $PO_4$ and Y is OH and/or F. This allows the precipitation of aluminium, phosphate, sodium and fluoride from solution. Sodium is also present in the lithium precipitation filtrate 29 (as sodium sulphate), which is used to prepare the reagents as a slurry (limestone slurry or lime slurry) (Not shown). Lithium does not form an alunite. Phosphate will precipitate. Phosphate may interchange with sulfate in the alunite lattice and it may also precipitate as aluminium phosphate, calcium phosphate, or as a combination of each of these.

Alunite precipitates at high temperature (>90° C.) and in the pH range of 2-3, preferably about 2.50. In tests the Applicants have consistently produced alunite and the fluorine concentration has dropped from 5 g/L to <2 g/L.

The operation of the low pH impurity removal step at a high temperature, as described, enables the precipitation of these various impurities, particularly phosphate, at a relatively low pH, with the aim of minimising any co-precipitation of lithium.

It is desirable to remove fluoride and phosphate in this stage as lithium may precipitate as lithium fluoride and/or lithium phosphate in the subsequent high pH impurity removal stage. Alunite also filters and dewaters well, so as well as capturing the phosphate and fluoride, it is also easy to handle.

The filtrate 15 from the low pH impurity removal stage 80, which contains the majority of the contained lithium from the amblygonite ore or concentrate 1, is passed to a high pH impurity removal stage 100. Lime 16 is used to precipitate impurity base metals such as iron, manganese and magnesium. A slurry 17 from the high pH impurity removal stage 100 is passed to a solid liquid separation step 110 and the solids are washed with water 33, from which the high pH impurity removal solids 19 are discarded.

The filtrate 20 from the high pH impurity removal stage 100, which contains the majority of the contained lithium from the amblygonite ore or concentrate 1, is subject to a calcium removal stage 120, which can be a combination of precipitation and ion exchange. Sodium carbonate solution 21 is used to precipitate calcium from solution as $CaCO_3$ 23. A slurry 22 from stage 120 is passed to a solid liquid separation step 130, from which the precipitated $CaCO_3$ 23 and residual lithium is recycled to the low pH impurity removal stage 80.

The filtrate 24 from the calcium precipitation stage can be further cleaned of calcium by an ion exchange process (not shown), if required.

The filtrate 24 from the calcium removal stage 120, which contains the majority of the contained lithium from the amblygonite ore or concentrates 1, and is low in impurities, is subject to the lithium recovery stage 140. If required, this solution is pre-concentrated by evaporation (not shown). $Na_2CO_3$ 25 is added to the filtrate 24 to force the precipitation of $Li_2CO_3$ 28. Reactors (not shown) employed in stage 140 are heated to >80° C. to allow for high lithium recovery.

A slurry 26 from stage 140 is passed to a solid liquid separation step 150 and the solids are washed with water 27. A filtrate 29 from step 150 is directed to the sodium sulfate crystallisation stage 160 to recover $Na_2SO_4$ 30. The filtrate 31 from this stage is recycled to the low pH impurity removal stage 80.

Figure 2:
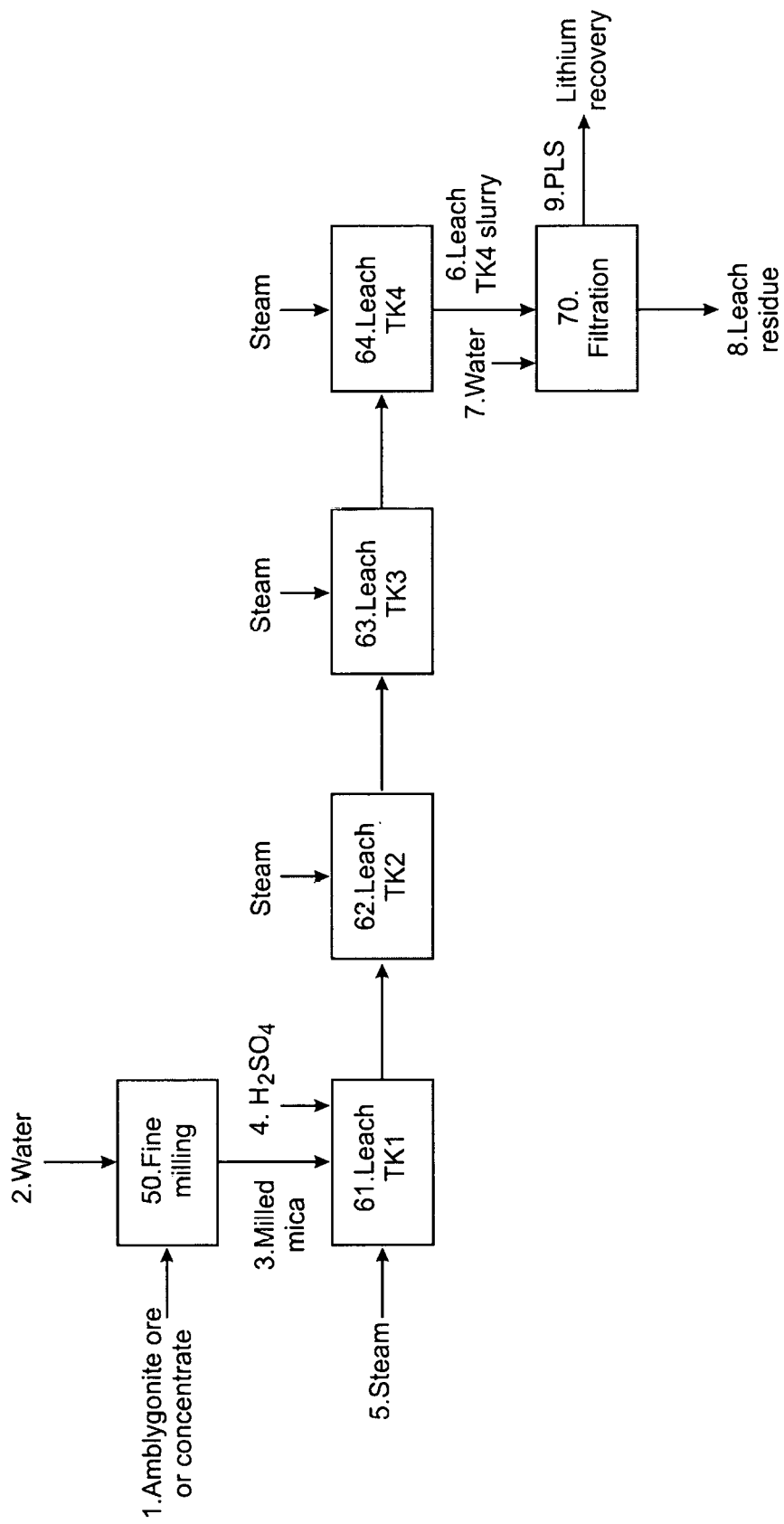
FIG. 2 is a flow sheet depicting in detail the leaching stage of the process of FIG. 1.

In FIG. 2 there is shown a flow sheet in accordance with the leaching stage 60 of the present invention. Like numerals denote like parts, steps or processes. The amblygonite containing ore or concentrate 1 is passed to the milling step 50 in which the ore or concentrate is milled, with water 2, to reduce the particle size and enable rapid dissolution of the contained amblygonite, as noted hereinabove. The milled amblygonite 3 is directed to the first of four leach reactors in the leaching stage 60, for example a first leach reactor 61. In leach reactor 61 concentrated sulfuric acid 4 is added at a rate to provide the sulfate ions necessary to form sulfate salts of the relevant cations in amblygonite and as well as excess to enable a residual sulfuric acid concentration of >50 g/L in the leach liquor. That is, acid is generally added as a ratio control. Steam 5 may also be added to ensure the target temperature of about 120° C. is achieved. The percent solids of the amblygonite containing leach feed is also controlled to target a specific metal concentration of the final leach liquor.

Leach slurry discharges from the first leach reactor 61 and enters a second leach reactor 62. Slurry then gravities through the second leach reactor 62 to a third leach reactor 63 and subsequently to a fourth leach reactor 64. The several leach reactors 61, 62, 63 and 64 are required to provide the necessary retention time, 6-12 hours, to achieve adequate extraction of the valuable components from the amblygonite and to minimise short circuiting of slurry to the solid liquid separation step 70. Steam may be added to each of the reactors 62, 63 and 64 also, if required to maintain the target temperature.

The sulfuric acid concentration in the liquor can range from >500 g/L $H_2SO_4$, in particular exiting the earlier reactors, for example reactors 61 and 62, down to >50 g/L $H_2SO_4$ exiting the final reactor 64. The free acid concentration is dependent on the percent solids in the feed, and target metal concentration in the leach liquor, but is preferably >50 g/L.

Slurry from the fourth reactor 64 is passed to the solid liquid separation step 70, which enables the leach slurry to be filtered at or near the leaching temperature. The filtration stage produces the PLS 9 containing the bulk of the extracted lithium, sodium, phosphate, aluminium and fluorine and a leach residue 8, which is washed with water 7. The wash filtrate can be combined with the PLS 9 and the leach residue 8 is discarded.

As can be seen from the above description, the present invention provides a process by which a lithium containing salt product can be obtained from minerals rich in both lithium and phosphate. Such a result has not previously been achievable by way of prior art methods, particularly in terms of the separation of the target lithium from phosphate and the process steps by which the one or more impurity elements are removed, so as to not precipitate both lithium carbonate and lithium phosphate.

Modifications and variations such as would be apparent to the skilled addressee are considered to fall within the scope of the present invention.

The invention claimed is:

1. A process for the recovery of lithium from minerals rich in lithium and phosphate, the process characterised by comprising
passing an ore containing one or more minerals rich in lithium and phosphate to an acid leach step thereby producing a pregnant leach solution,
subjecting the pregnant leach solution to a series of process steps by which one or more impurity elements are removed, and
recovering lithium as a lithium containing salt product, wherein the series of process steps by which one or more impurity elements are removed includes a low pH impurity removal step conducted at a pH ranging from 2 to 3 and at an elevated temperature of greater than 90° C. for the precipitation of one or more impurities,
wherein the one or more impurities including alunite, and
wherein a base is added to the low pH impurity removal step.

2. The process of claim 1, wherein the base added to the low pH impurity removal step is one or more of limestone, lime or monovalent carbonate, or hydroxide salts.

3. The process of claim 1, wherein the precipitated impurities of the low pH impurity removal step include sulfuric acid, sodium, aluminium, phosphate, and/or fluoride.

4. The process of claim 1, wherein the conditions of the low pH impurity removal step are such that substantially no lithium is co-precipitated in the low pH impurity removal step.

5. The process of claim 1, wherein the lithium containing salt product contains $Li_2CO_3$ and/or $LiOH \cdot H_2O$.

6. The process of claim 1, the lithium and phosphate rich minerals include amblygonite and/or montebrasite.

7. The process of claim 1, wherein a pre-treatment step is provided prior to the acid leach step, the pre-treatment step comprising one or both of a concentration step.

8. The process of claim 7, wherein the milling step produces a product having a particle size of $<P_{80}$ 150 micron.

9. The process of claim 1, wherein concentrated sulfuric acid is added during the acid leach step and results in at least a proportion of any contained lithium, sodium, phosphate, aluminium and fluoride being extracted into solution, thereby forming the pregnant leach solution.

10. The process of claim 1, wherein the leaching step is conducted under atmospheric pressure conditions and
at a temperature at or about 90 to 120° C.

11. The process of claim 9, wherein the leaching step is carried out with an excess of $H_2SO_4$ providing a free acid concentration of greater than about 50 g/L $H_2SO_4$ and:
the total sulfate concentration is 6.0M S at >90° C.

12. The process of claim 1, wherein in the acid leach step greater than about 90% metal extraction is achieved with a retention time of about 12 hours.

13. The process of claim 1, wherein the low pH impurity removal step produces precipitated solids that are washed with water to recover entrained lithium.

14. The process of claim 1, wherein a filtrate is passed from the low pH impurity removal step to a high pH impurity removal step, in which impurity base metals are precipitated through the addition of a base, the base being lime and/or a monovalent hydroxide salt, and the impurity base metals including iron, manganese, and/or magnesium.

15. The process of claim 14, wherein calcium is precipitated from a filtered product of the high pH impurity removal step by the addition of a monovalent carbonate salt being $Li_2CO_3$ or $Na_2CO_3$.

16. The process of claim 14, wherein calcium is precipitated from a filtered product of the high pH impurity removal step by the addition of a monovalent carbonate salt being $Li_2CO_3$ or $Na_2CO_3$, and lithium carbonate is precipitated by the addition of a monovalent carbonate salt to a filtered product of calcium precipitation.

17. The process of claim 14, wherein the high pH impurity removal step is operated at a pH of >9.

18. The process of claim 1, wherein a filtrate is passed from the low pH impurity removal step to a high pH impurity removal step, in which impurity base metals are precipitated through the addition of a base,
the base being lime and/or a monovalent hydroxide salt, and
the impurity base metals including iron, manganese, and/or magnesium,
calcium further being precipitated from a filtered product of the high pH impurity removal step by the addition of a monovalent carbonate salt being $Li_2CO_3$ or $Na_2CO_3$, and
lithium carbonate is precipitated by the addition of a monovalent carbonate salt to a filtered product of calcium precipitation, the $Li_2CO_3$ precipitation stage being operated at an elevated temperature of >90° C., and the liquor volume is reduced by evaporation.

19. The process of claim 18, wherein the elevated temperature of the $Li_2CO_3$ precipitation stage is operated at >90° C.

20. The process of claim 16, wherein the monovalent carbonate salt is $Na_2CO_3$.

* * * * *